March 31, 1931.  W. W. FRYMOYER  1,799,131
CONTROL MECHANISM
Filed Aug. 14, 1928
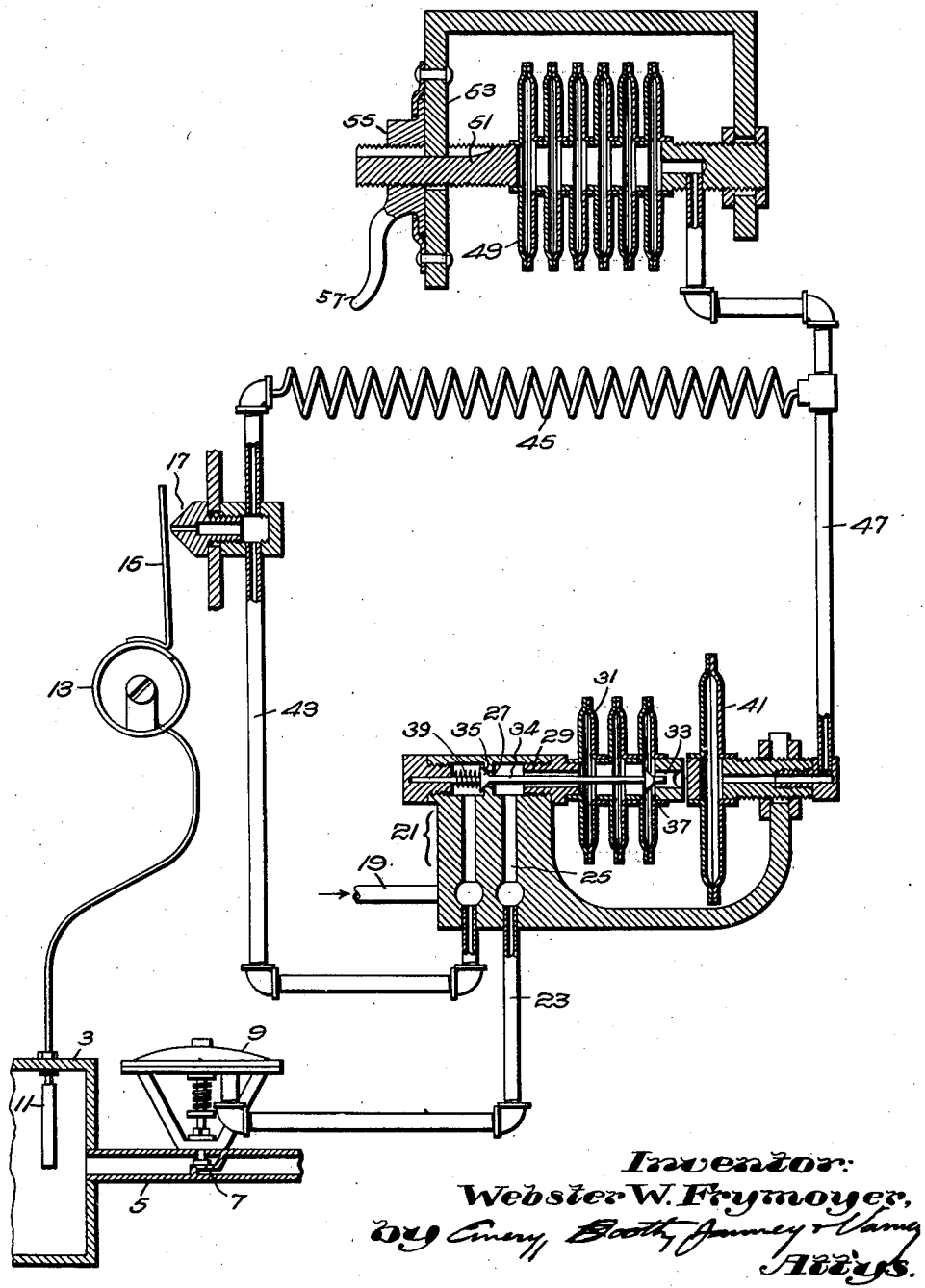

Patented Mar. 31, 1931

1,799,131

UNITED STATES PATENT OFFICE

WEBSTER W. FRYMOYER, OF FOXBORO, MASSACHUSETTS, ASSIGNOR TO THE FOXBORO COMPANY, OF FOXBORO, MASSACHUSETTS, A CORPORATION OF MASSACHUSETTS

CONTROL MECHANISM

Application filed August 14, 1928. Serial No. 299,572.

This invention relates to a pneumatic controlling mechanism of that kind wherein some device, usually a valve, operated by a fluid pressure motor is controlled in desired manner, usually in accordance with some variable, such, for instance, as rate of flow, pressure, humidity or temperature. For convenience I shall herein disclose its application to the control of a valve supplying heating fluid to a chamber, the valve being controlled in accordance with the temperature in such chamber, but it will be understood that the scope of the invention is by no means limited to such an application.

For many purposes it is desirable to have a controlled valve float in partially open position and shift from one position of adjustment to another at a slow rate; for example, in the control of the flow of fluid in accordance with the rate of flow the valve should open gradually until the desired flow is obtained and then vary only as the conditions altering the flow change. It is not desirable that the controlled valve alternate between shut and wide open positions as the flow will then be in surges, creating conditions that may be detrimental to correct measurement of the flow or to the operation to which the flow is incidental. In the case of temperature control, as herein illustrated by way of example, instances also occur where a slow valve is necessary. My invention particularly relates to a controlling mechanism adaptable to operate a valve or other controlled mechanism in such manner, whether thermally governed as in the example illustrated or otherwise.

My invention will be well understood by reference to the following description of an illustrative embodiment thereof shown by way of example in the accompanying drawing, which discloses in a diagrammatic manner, with parts in section, a heating control installation embodying a mechanism illustrative of my invention as a part thereof.

Referring to the drawing, I have there shown a chamber 3 to which heating fluid is supplied through the pipe 5 under control of the valve 7 actuated by a diaphragm motor 9. In the chamber may be disposed a bulb 11 of a vapor pressure thermometer embodying a helical Bourdon tube 13 which is adapted to operate a valve or "flapper" 15 closing against a valve seat or "nozzle" 17 constituting an exhaust port for a pressure system, as will presently be described. This thermometer constitutes an example of a mechanism adapted to operate a control valve in accordance with the fluctuations of a variable, ordinarily one the value of which is dependent in part on the operation of the valve 7 or similar mechanism. I have herein shown the flapper 15 as directly attached to the helical tube 13 and the nozzle 17 as stationary, but in practice the construction may conveniently be similar to that disclosed in the patent to Dixon 1,582,-868, April 27, 1926.

To operate the diaphragm motor, fluid under pressure is supplied from a suitable source through the pipe 19, through the control head 21 and pipe 23 to the chamber of the diaphragm motor. The chamber 25 in the control head from which the pipe 23 is supplied may have in one wall thereof an intake port 27, and in alignment therewith an opening 29. Supported exteriorly of the opening and in communication with chamber 25 through the same I have shown a set of expansible diaphragms 31, and the opposite wall of the chamber formed thereby, which moves when the chamber expands under pressure, is provided with an exhaust port 33. Cooperating with these ports is a suitable double valve embodying a valve stem 34 having heads 35 and 37 adapted to close the intake and exhaust ports respectively and being spaced apart on the stem a distance slightly less than the normal distance between these ports. A spring 39 normally presses the valve to the right and the supply port is closed but the waste or exhaust port is open, the seat of the head 37 being supported by the diaphragms 31 away from that head. This double valve serves as an example of a supply and waste valve and in the position shown pressure fluid from pipe 19 is cut off from the diaphragm motor and the chamber of the diaphragm motor is exhausted to the atmosphere through the open waste port at 33.

To operate the supply and waste valves to permit pressure fluid to flow to motor 9 I may utilize an expansible diaphragm 41 opposing the diaphragm 31 and adapted, when dilated, to make contact with the ported wall of the latter, compressing diaphragms 31, moving the seat of the waste valve against head 37 and then by bodily movement of valve stem 34 with its attached valve heads to open the supply valve against the spring 39. To expand diaphragm 41 air may be admitted from the main source of supply, through pipe 43 in which is located the exhaust port provided by the nozzle 17, a connection presently to be described, and pipe 47. Disregarding the nature of the connection 45, the operation will then be as follows. With the parts in the position shown, the supply valve 35 is closed, the diaphragm motor 9 is exhausted to the atmosphere and the controlled valve 7 is closed. Control valve 15 is spaced from nozzle 17 and pressure fluid in pipe 19 is exhausted to the atmosphere through that nozzle. Now, if valve 15 closes, pressure fluid will flow to the diaphragm 41 which will expand, pressing the seat of port 33 against valve 37 and then opening supply valve 35, admitting compressed air to the motor to open main valve 7. As the result of admission of heating fluid to the chamber 3 the helical tube 13 will expand, moving valve 15 away from nozzle 17. This permits the fluid in pipe 43 to exhaust to the atmosphere, the expansible chamber 41 will collapse, diaphragm 31 expands, the supply of pressure fluid will be cut off and the waste valve open to permit the diaphragm motor 9 to exhaust to the atmosphere and controlled valve 7 to close.

To provide for a time lag in the action and permit controlled valve 7 to float in a desired position of adjustment, the connection 45 may be made a restricted one to permit only a slow passage or seepage of pressure fluid therethrough. This may be effected in various ways, but I have herein shown the connection 45 as consisting of a length of capillary tubing of exceedingly small bore so that air can pass therethrough only very slowly and also of considerable length so as to impose considerable frictional resistance to such passage. This structure typifies a suitable arrangement for securing desired slowness of action as described in the first part of this specification. The operation may be understood from the following description. Let us suppose that for the desired purpose the controlled valve 7 is to float in a partially open position. For purposes of definiteness in the following description and without attaching to the specific values given any significance other than convenient abbreviations, let us suppose that the desired rate of flow would correspond to the valve being half open and that the pressure of ten pounds per square inch in the diaphragm motor which operates it would so hold it open. Now, when the installation is initially started up, the parts of head 21 are in the position shown in the drawing, the controlled valve 7 is closed and flapper 15 lies on the nozzle 17. A supply of air at a suitable pressure, say fifteen pounds per square inch, is admitted through pipe 19 and flows into pipe 43 but because of the restricted nature of the connection 45 the pressure of fifteen pounds per square inch is not immediately felt in the diaphragm chamber 41. On the contrary, it builds up slowly subject to the retardation of the connection 45 until it reaches ten pounds. While this is going on, 41 expands, closing the waste valve at 37 and opening supply valve 35, and the supply of compressed air flows through the latter and is felt in about equal degree in the diaphragm motor 9 of the controlled valve and in the diaphragms 31. When it balances the pressure in 41, it tends to crack valve 37 and permit valve 35 to close under the action of its spring 39. The pressure in 31 follows proportionately with the increased pressure on the diaphragm 41 until the desired pressure of ten pounds is built up in 41. This pressure of ten pounds is thus felt in the diaphragm motor 9 and the valve is half open. As long as the pressure of ten pounds exists in diaphragm 41 this desired pressure will subsist in the chamber of motor 9 because if the pressure increases, pressure in diaphragms 31 will overbalance the pressure in 41, the waste valve will crack open and the supply valve close until equilibrium is established. Conversely, if the pressure falls too low, the pressure in 41 will close the waste valve and open wider the supply valve.

The flow of heating medium to the chamber 3 is effective on the bulb 11 of the thermometer and it may be assumed that when the desired flow is established, the desired temperature is established, and if the pressure in diaphragm 41 builds up above ten pounds, causing a decrease in the pressure of the diaphragm motor 9 and a corresponding wider opening of the controlled valve 7, the temperature will rise unduly high, flapper 15 will move away from the nozzle 17, the pressure in 41 slowly drops toward ten pounds again, diaphragms 31 expand, the valve at 37 opens wider, the diaphragm motor 9 of the controlled valve exhausts and the controlled valve 7 tends to close slowly toward the half-open position.

To further provide for a lag in the response of the controlling mechanism and to permit an adjustment of this lag, a chamber 49 may be provided in communication with the pressure system of pressure motor 41 at the discharge side of the connection 45. I have herein shown this chamber 49 as in the form of a bellows or set of diaphragms, but in the present embodiment of the invention it serves at any given time as a chamber of fixed capacity substantially undeformable under the pressures involved. Supposing, then, pressure fluid to be flowing slowly through the connection 45 to build up the pressure on the discharge side thereof, obviously the increased volume provided by this chamber retards the attainment of elevated pressure on the discharge side of the system and consequently the attainment of such pressure in the diaphragm 41, and conversely, when the control valve 15 opens to exhaust the system, a greater volume of air must flow through the restricted connection 45 before a given reduced pressure obtains in the chamber 41. The construction of the chamber 49 as a bellows or its equivalent permits its capacity or volume to be adjusted and thus the time lag of the mechanism to be adjustable. I have herein shown the bellows 49 as fixed at the right-hand end while the opposite or movable end of the bellows carries a screw 51 having a splined connection in the supporting bracket 53. A nut 55 swivelled on this bracket engages the screw and is provided with a suitable handle 57 by means of which it may be turned, moving the screw 51 to the right or left as the case may be and diminishing or increasing the internal volume of chamber 49.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A pneumatic control mechanism comprising a valve mechanism of the supply and waste type, means actuated by the controlled pressure for shifting the same to waste position, a pressure system having a part movable in response to the pressure therein for shifting the valve mechanism to supply position against said means, and a control valve governing exhaust from said system.

2. A pneumatic control mechanism comprising a valve mechanism of the supply and waste type, means actuated by the controlled pressure for shifting the same to waste position, a pressure system having a part movable in response to the pressure therein for shifting the valve mechanism to supply position against said means, retarding means whereby pressure admitted to said system builds up slowly to operate said movable part, and a control valve governing exhaust from said system.

3. A pneumatic control mechanism comprising a valve mechanism of the supply and waste type, means actuated by the controlled pressure for shifting the same to waste position, a pressure system having a part movable in response to the pressure therein for shifting the valve mechanism to supply position against said means, said system comprising a restricted connection through which pressure fluid seeps to said movable part and a chamber of adjustable capacity between said connection and part, and a control valve at the pressure-receiving side of said connection governing exhaust from said system.

4. A pneumatic control mechanism comprising a valve mechanism of the supply and waste type, means actuated by the controlled pressure for shifting the same to waste position, a pressure system having a part movable in response to the pressure therein for shifting the valve mechanism to supply position against said means, retarding means whereby pressure admitted to said system builds up slowly to operate said movable part, and a control valve on the pressure-receiving side of said retarding means governing exhaust from said system.

5. A pneumatic control mechanism comprising a double valve mechanism providing for supply and waste of fluid to and from a controlled mechanism, a pressure expansible element in communication with said controlled mechanism adapted to move the seat of the waste couple away from its cooperating valve, a second pressure expansible element opposing the first, and means responsive to a variable to provide a pressure in said second element effective to operate said double valve against the action of said first element.

6. A pneumatic control mechanism comprising a double valve mechanism providing for supply and waste of fluid to and from a controlled mechanism, a pressure expansible element in communication with said controlled mechanism adapted to move the seat of the waste couple away from its cooperating valve, a second pressure expansible element opposing the first, and means including a control valve responsive to the fluctuations of a variable to permit pressure fluid to seep to and from said second element.

7. A pneumatic control mechanism comprising a valve mechanism of the supply and waste type, means responsive to the controlled pressure tending to shift the same to waste position, a pressure responsive device for shifting the valve mechanism to supply position in opposition to said means, and means including a control valve responsive to the fluctuations of a variable to permit pressure fluid to seep to and from said device.

8. A pneumatic control mechanism comprising a valve mechanism of the supply and waste type, means responsive to the controlled pressure tending to shift the same to waste position, a pressure responsive device for shifting the valve mechanism to supply position in opposition to said means, and means to control flow of pressure fluid to and from said device comprising a control valve responsive to the fluctuations of a variable and a connection of minute capacity between said control valve and said device.

9. A pneumatic control mechanism comprising a valve mechanism of the supply and waste type, means responsive to the controlled pressure tending to shift the same to waste position, a pressure responsive device for shifting the valve mechanism to supply position in opposition to said means, and means to control flow of pressure fluid to and from said device comprising a control valve responsive to the fluctuations of a variable, a connection of minute capacity between said control valve and said device and a chamber of adjustable volume in communication with said device at the delivery side of said connection.

10. A pneumatic control mechanism comprising a conduit for conveying pressure fluid to and from the mechanism to be controlled and having aligned inlet and outlet openings, a chamber organized about said inlet and having a wall movable in response to pressure conditions in the chamber which wall is provided with an opening in alignment with the inlet and outlet openings, a valve stem extending through the openings having valves cooperating with said inlet opening and the opening in said wall respectively and spaced a distance less than the normal spacing of said openings, a pressure responsive device for moving said wall against the pressure in the chamber, and means for controlling the pressure in said device.

11. In a pneumatic control mechanism a double valve mechanism comprising supply and waste couples, a pressure operated device subject to the controlled pressure for relatively adjusting the elements of one couple, a pressure operated device for shifting the couples from waste to supply position, and a control valve governing the supply of pressure fluid to said second device.

12. A pneumatic control mechanism comprising a valve mechanism of the supply and waste type, a pressure operated device adapted to shift the same towards one position and on exhaust permitting its return towards the other position, a control couple governing the supply of pressure fluid to said device, a restricted connection through which the fluid seeps, and a pressure-fluid receiving chamber of relatively large capacity on the side of said connection adjacent the said device.

13. In a control mechanism for controlling the flow of fluid to a locus for establishing and maintaining a variable condition thereat at a predetermined value, in combination, a valve, an expansible chamber which under the influence of pressure conditions therein moves the valve thereby to effect the rate of fluid flow, a line to supply fluid under pressure to said chamber, a control couple for the line comprising a part having a bleeding port and a part forming a valve therefor, means responsive to fluctuations of the variable for moving one of said parts, said line comprising a restricted passage between said couple and expansible chamber providing for seepage of fluid from one to another, and a chamber of relatively great capacity in communication with the line between said passage and said expansible chamber.

14. A mechanism as defined in claim 13 wherein the volume of the chamber of relatively great capacity is adjustable.

15. In a pneumatic control mechanism, in combination with a control couple consisting of an element having a bleeding port and a valve element and means responsive to the fluctuations of a variable for relatively adjusting the same, a pressure operated device governed by said couple and means for causing a time lag in the governing action comprising a restricted connection between said couple and said device providing for seepage of fluid therethrough and a chamber of relatively great capacity connected between said passage and said device.

In testimony whereof, I have signed my name to this specification.

WEBSTER W. FRYMOYER.